(12) United States Patent
Wasilewski (10) Patent No.: US 8,893,185 B2
(45) Date of Patent: Nov. 18, 2014

(54) SYSTEMS AND METHODS FOR COMBINING USER PROFILES

(75) Inventor: Louise Mary Wasilewski, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 244 days.

(21) Appl. No.: 13/162,759

(22) Filed: Jun. 17, 2011

(65) Prior Publication Data

US 2012/0324550 A1 Dec. 20, 2012

(51) Int. Cl.
- *H04N 5/445* (2011.01)
- *H04N 21/466* (2011.01)
- *H04N 21/25* (2011.01)
- *H04N 21/258* (2011.01)
- *H04N 21/482* (2011.01)
- *H04L 29/06* (2006.01)
- *G06F 21/10* (2013.01)

(52) U.S. Cl.
CPC ............ *G06F 21/10* (2013.01); *H04N 21/4661* (2013.01); *H04N 21/252* (2013.01); *H04N 21/25891* (2013.01); *H04N 21/4826* (2013.01); *H04L 63/08* (2013.01); *H04L 63/102* (2013.01)
USPC ......... 725/46; 725/47; 725/48; 726/5; 726/28

(58) Field of Classification Search
CPC ............ H04N 21/4661; H04N 21/252; H04N 21/4826; H04N 21/25891; H04N 21/4532; H04N 7/17318; H04W 8/18; H04L 29/08936
USPC .......................... 726/3, 5, 28; 725/46, 47, 48
See application file for complete search history.

(56) References Cited

U.S. PATENT DOCUMENTS

| | | | |
|---|---|---|---|
| 7,376,897 B1 | 5/2008 | Mao | |
| 7,657,907 B2 | 2/2010 | Fennan et al. | |
| 2006/0053449 A1* | 3/2006 | Gutta | 725/46 |
| 2008/0319908 A1* | 12/2008 | Venkatachalam et al. | 705/50 |
| 2009/0013085 A1* | 1/2009 | Liberman Ben-Ami et al. | 709/230 |
| 2009/0231102 A1* | 9/2009 | Hyde et al. | 340/10.1 |
| 2011/0209177 A1* | 8/2011 | Sela et al. | 725/39 |

* cited by examiner

*Primary Examiner* — Kaveh Abrishamkar
*Assistant Examiner* — Ayoub Alata
(74) *Attorney, Agent, or Firm* — Sutherland Asbill & Brennan LLP (57) ABSTRACT

Certain embodiments of the invention may include systems and methods for combining user profiles. According to an example embodiment, a method is provided for refining group content choices. The method includes identifying that at least two users are accessing media content on a same device, wherein each of the at least two users is associated with a different set of profile attributes; generating a spliced user profile having spliced profile attributes based at least in part on at least a portion of the set of profile attributes associated with at least one of the at least two users; determining at least one content recommendation based on the spliced profile attributes; and delivering the at least one content recommendation over a content distribution channel to the at least two users on the media device.

25 Claims, 5 Drawing Sheets

SYSTEMS AND METHODS FOR COMBINING USER PROFILES

FIELD OF THE INVENTION

This invention generally relates to systems and methods for combining user profiles to enhance user experience for a group of users, and in particular, the invention relates to providing recommendations based on a combination of the user profiles.

BACKGROUND OF THE INVENTION

One challenge that presents itself when multiple people gather together to watch a video, for example, is to pick programming that everyone will enjoy. For example, a child may be interested in certain types of programming that may not appeal to an adult, and vice versa. Media companies have recommendation engines that can provide media users with suggestions for programming based on account usage (a static hybrid identity) or on individual user usage, which might be based on how an individual user has intentionally rated past content. However, the drawback with this approach is that such recommendation engines often make recommendations based on a solo media consumer or on most recent viewing history, rather than a longer sample set, which may result in an unsatisfactory experience for others who are also viewing the media.

BRIEF SUMMARY OF THE INVENTION

Some or all of the above needs may be addressed by certain embodiments of the invention. Certain embodiments of the invention may include systems and methods for combining user profiles, or portions thereof.

According to an example embodiment of the invention, a method is provided for refining group content choices. The method includes identifying that at least two users are accessing media content on a same device, wherein each of the at least two users is associated with a different set of profile attributes. The method further includes generating a spliced user profile having spliced profile attributes based at least in part on at least a portion of the set of profile attributes associated with at least one of the at least two users; determining at least one content recommendation based on the spliced profile attributes; and delivering the at least one content recommendation over a content distribution channel to the at least two users on the media device.

According to an example embodiment of the invention, a system is provided for combining user profiles to refine group content choices. The system includes at least one memory for storing data and computer-executable instructions, and at least one processor configured to access the at least one memory and further configured to execute the computer-executable instructions for receiving login credentials for at least two users; accessing the sets of profile attributes of the at least two users based at least in part on the login credentials for the at least two users; identifying that the at least two users are accessing media content on a same device, wherein each of the at least two users is associated with a different set of profile attributes; generating a spliced user profile having spliced profile attributes based at least in part on at least a portion of the set of profile attributes associated with at least one of the at least two users; determining at least one content recommendation based on the spliced profile attributes; and delivering the at least one content recommendation over a content distribution channel to the at least two users on the media device.

Other embodiments and aspects of the invention are described in detail herein and are considered a part of the claimed invention. Other embodiments and aspects can be understood with reference to the following detailed description, accompanying drawings, and claims.

BRIEF DESCRIPTION OF THE DRAWINGS

Reference will now be made to the accompanying drawings, which are not necessarily drawn to scale, and wherein.

DETAILED DESCRIPTION OF THE INVENTION

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Certain embodiments of the invention may allow creating transient spliced identities for defining group access rights and/or recommendations when a group of more than one person is accessing content or other services. Splicing identities can mean combining and/or blending profile or identity information in any number of inclusive or exclusive arrangements. According to an example embodiment, a spliced profile may be created for a group's content experience, and the spliced profile may be based on profile attributes, preferences, or access rights of one or more users in the group. According to an example embodiment of the invention, a spliced profile can be inclusive or exclusive. In an example embodiment, inclusion or exclusion of attributes may be applied to at least one attribute. According to an example embodiment of the invention, the spliced profile may be used to recommend content, and/or to restrict access to content. When recommending content, according to an example embodiment, recommendations can be based on further considerations, such as the number of user preferences satisfied, the number of users whose user preferences are satisfied, etc.

Figure 3:
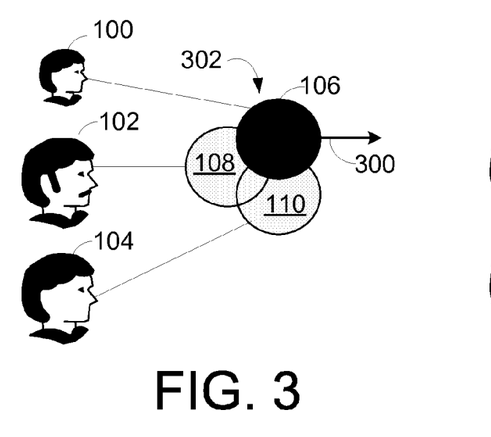
FIG. 3 is a depiction of an illustrative selection of inclusive user profile attributes based on one or more users, according to an example embodiment of the invention.
Figure 4:
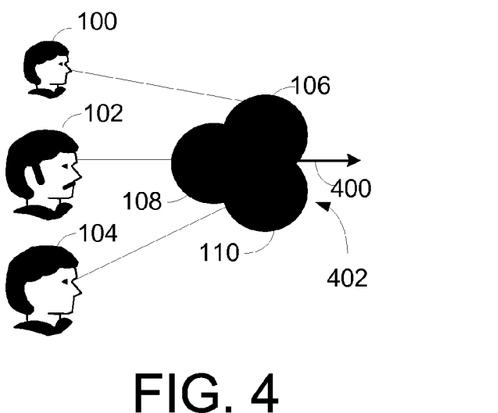
FIG. 4 is a depiction of an illustrative selection of inclusive user profile attributes based on all users, according to an example embodiment of the invention.

According to certain example embodiments, spliced profile attributes can be created in a number of ways. For example, an inclusive spliced profile may provide access to any and all content for which at least one member of the group of users has access rights (FIG. 4). In another example embodiment, an inclusive spliced profile may be utilized for providing content recommendations based on at least one of the user profile preferences or attributes (FIG. 3). Example embodiments of the inclusive spliced profile may not require that all users have access to, or have a preference for, content, just that at least one in the group does.

Figure 1:
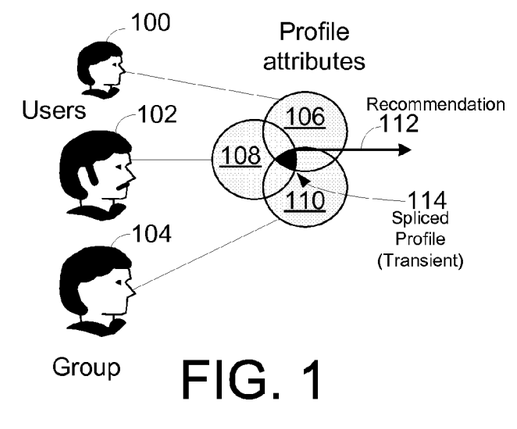
FIG. 1 is a depiction of an illustrative combination of exclusive user profile attributes, according to an example embodiment of the invention.
Figure 2:
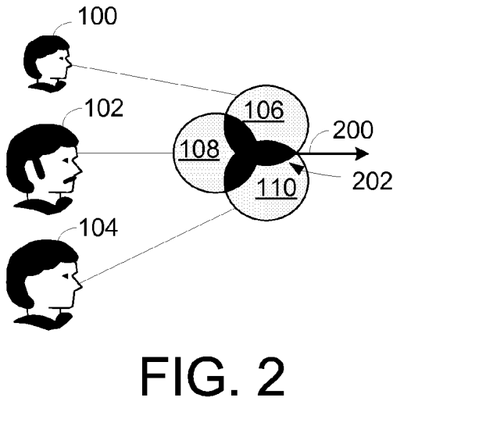
FIG. 2 is a depiction of an illustrative combination of exclusive user profile attributes with overlap for two or more users, according to an example embodiment of the invention.

According to an example embodiment, the spliced profile attributes may be based on an exclusive spliced profile. For example, an exclusive spliced profile may provide access only to content that all of the group of users have access rights to (FIG. 1). According to an example embodiment, an exclusive spliced profile provides recommendations for content that may be based on an overlap of the group of user profile preferences (FIG. 2). In an example embodiment, for an exclusive spliced profile, it may be required that all users in the group have access to content, or prefer certain content. According to an example embodiment, recommendations may satisfy all preferences. According to an example embodiment, access may be granted for content to which all users have access rights. According to an example embodiment, all users may be required to hold adequate rights (and provide login credentials) for access to sensitive, restricted, or classified information or materials, such as certain military information or sensitive corporate information for example.

According to example embodiments of the invention, recommendations may be made that satisfy more than just simple inclusive or exclusive splicing logic. For example, in one embodiment, content that has one or more attributes that satisfy one or more preferences of more than one user in the group can be preferred over simple inclusive logic that would recommend content based on anyone in the group. According to an example embodiment, recommendations may be based on satisfying a majority of the combined inclusive profile. According to an example embodiment, recommendations may be based on a majority of the attributes satisfying a majority of the combined exclusive profile. According to an example embodiment, recommendations may be based on attributes that satisfy a majority of the individual users in the group.

According to example embodiments of the invention, media and/or content may be identified for access and/or identified for making recommendations to a group of users based on combined profile attributes. According to example embodiments, media and/or content may include linear audio/video programming; non-linear audio/video programming; digital music downloads; digital music streaming; satellite radio; Internet content; e-book content; electronic magazine content; web log (blog) content; advertising content; downloadable software/applications; cloud-based streaming applications; wireless communication content including cell phone and/or mobile device applications, etc.

According to an example embodiment, media and/or content and/or services may be identified for access and/or identified for making recommendations based on spliced profile attributes from multiple user logins or multiple user detection. In an example embodiment, the access or recommendations may be utilized to address multiple users of the same or associated devices with different preferences or access rights.

According to certain example embodiments, computing/thin client/streaming/digital content leasing or access control applications may utilize the spliced attributes for use with highly restricted/protected applications and/or data, for example, within a software application. For example, an exclusive spliced profile may allow restricting access to only the media or content that everyone in the group is authorized to access. In certain example embodiments, such as in a joint teleconference where group participants are not all actually in the same room and viewing the same physical device, the spliced profile attributes may be utilized for granting access to content or media as a function of the participants present at a particular location or group of locations. For example, only those locations where all participants have access rights may receive certain data, media, or content feeds.

According to certain example embodiments of the invention, an inclusive spliced profile may allow access to media or content that anyone in a room is authorized to access. According to an example embodiment, the inclusive spliced profile may allow for collaboration by the group, and may allow accessing and utilizing more content by each user in a group than may be available with an exclusive splice profile. According to an example embodiment, accessing and utilizing content with an inclusive spliced profile may include viewing subscription television content at home with guests who have not purchased the subscription.

According to an example embodiment of the invention, targeted advertisement may be based on spliced profiles. According to example embodiments, targeted advertising content techniques may be tailored to include and consider the preferences of the group. Example embodiments may include cable/satellite based advertising, Internet based advertising, wireless advertising, short messaging service (SMS), multimedia messaging service (MMS), in-application advertising, etc.

According to an example embodiment of the invention, e-mails may be formatted, processed, and/or directed based on spliced profiles and/or identifications. In a standard e-mail program or interface, one person usually creates the e-mail, and may have the option to send the e-mail to more than one receiver or recipient. According to an example embodiment of the invention, e-mail may be created and sent as if it came from a group of senders. Example embodiments may allow sending e-mail from more than one sender. Example embodiments may indicate that the e-mail came from more than one sender. In an example embodiment, the invention may allow selecting multiple senders of an e-mail message. For example, the e-mail from multiple senders may be sent to a recipient's inbox, and the e-mail may appear in the outbox of each of the selected senders. Additional details and embodiments for the multi-sender e-mail invention will be discussed below.

Various systems parts, machine-readable code, hardware and software modules for utilizing spliced profiles will now be described with reference to the accompanying figures, according to example embodiments of the invention.

FIGS. 1-4 depict various examples, according to embodiments of the invention, where profile attributes corresponding to multiple users may be utilized to generate a spliced profile that may, in turn, be utilized for providing recommendations, access, e-mail routing, etc. For example, FIG. 1 indicates users 100, 102, 104 in a group, each with corresponding profiles 106, 108, 110. In an example embodiment, a spliced profile 114 may be deduced from the overlap of the profiles 106, 108, 110, and the spliced profile 114 may be utilized to deduce the recommendation 112. According to an example embodiment, the individual profiles may represent preferences, access rights, or other information pertaining to the specific user in the group. FIG. 1 depicts generating an exclusive transient spliced profile 114 based on a general logic AND function. For example, the transient spliced profile 114 may be generated based on a region of exclusive overlap of all of the individual user profiles 106, 108, 110 and may be utilized for access, and/or to generate a recommendation 112.

FIG. 2 depicts generating a hybrid exclusive spliced profile, according to an example embodiment of the invention, based on a combined logic AND function satisfying the overlap of two or more user profiles. For example, a combined profile attribute 202, from which access, and/or recommendation(s) 200 may be generated based on a region of overlap satisfying the following logic: (first user profile) AND ((a second user profile) OR (a third user profile . . . .)) for each profile 106, 108, 110.

FIG. 3 depicts generating a profile attribute 302, from which, access and/or recommendation(s) 300 may be based upon any one of the individual user profiles 106, 108, 110, according to an example embodiment of the invention.

FIG. 4 depicts generating an inclusive spliced profile based on a logic OR function satisfying any of the user profiles. For example, a combined profile attribute 402, from which access and/or recommendation(s) 400 may be generated based on the following logic: (first user profile) OR (second user profile) OR (third user profile) and so forth.

Other combinations of profile attributes may be utilized to generate customized combined profiles according to example embodiments of the invention. For example, a combined profile attribute, access, and/or recommendation may be generated based on the overlap of individual profiles satisfying a hierarchy structure. For example, certain users may be categorized as tier 1 users, others as tier 2 users, and so forth. In example embodiments, the tier levels may be utilized to prioritize the content recommendations and/or to allow access to certain content.

According to example embodiment of the invention, individual attributes may be operated on independently. For example, the attribute "language" may be handled exclusively (per FIG. 1) such that only content in a language comprehended by all participants will be offered, but the attribute "genre" might be handled in an overlapping additive manner (FIG. 2) to include any genre preferred by at least two users. In an example embodiment, the attribute "subscription" might be handled in a fully inclusive manner (FIG. 4). According to an example embodiment, the generated profile may result in offering only content in a common language, to which any one of the users have access rights of genres (which may exceed the number of users).

Figure 5:
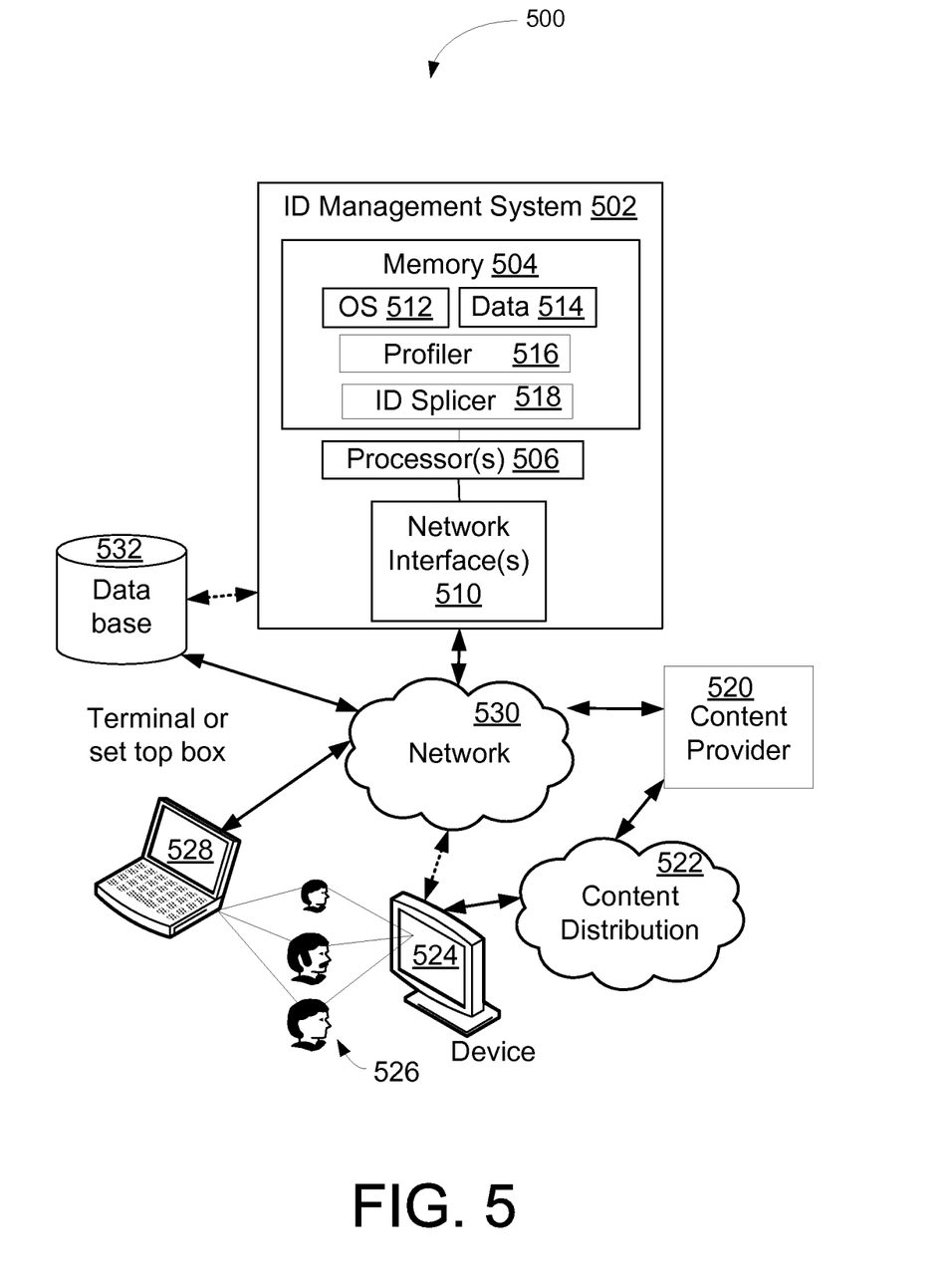
FIG. 5 is a block diagram of a profile attribute and splicer management system, according to an example embodiment of the invention.

FIG. 5 depicts a block diagram of an example user profile attribute and splicer management system 500, according to an example embodiment of the invention. In an example embodiment, the system 500 includes an identification management system 502, which includes memory 504, one or more processors 506, and one or more network interfaces 510 in communication with the one or more processors 506. According to an example embodiment, the memory 504 may include an operating system 512, data 514, a profiler module 516, and an identification splicer module 518. The one or more networks 530 may provide communication between the network interface 510 and various other remote devices, networks, etc.

According to an example embodiment, the memory 504, with associated machine readable code (for example, via the operating system 512, data 514, a profiler module 516, and an identification splicer module 518) may be utilized by the processor 506 for performing functions such as retrieving identity profiles from the database 532 based on login credential information, splicing the profiles, requesting content, etc., as will be further explained with reference to FIG. 6 below.

Returning to FIG. 5, and according to an embodiment of the invention, users 526 may register presence or input credentials into a computer, terminal, handset, voice recognition system, biometric recognition system, or set top box 528, which may communicate to the identification management system 502 via the network 530. In an example embodiment, the user credentials may be utilized by the identification management system 502 to generate a spliced profile. For example, information related to the user may be stored in a database 532, which may be in communication directly with the identification management system 502, or via the network 530. The information in the database 532 may be retrieved upon request and utilized by the identification management system 502.

In certain embodiments, the users 526 may be accessing a device 524 for content. For example, the device 524 may be a television, a computer, a sound system, tablet, etc. In an example embodiment, the device 524 may receive content from a content distribution network 522, and/or the device 524 may receive content via the network 530. According to an example embodiment, a content provider 520 may be utilized for providing content to the device 524 via the content distribution network 522, or other channels.

Figure 6:
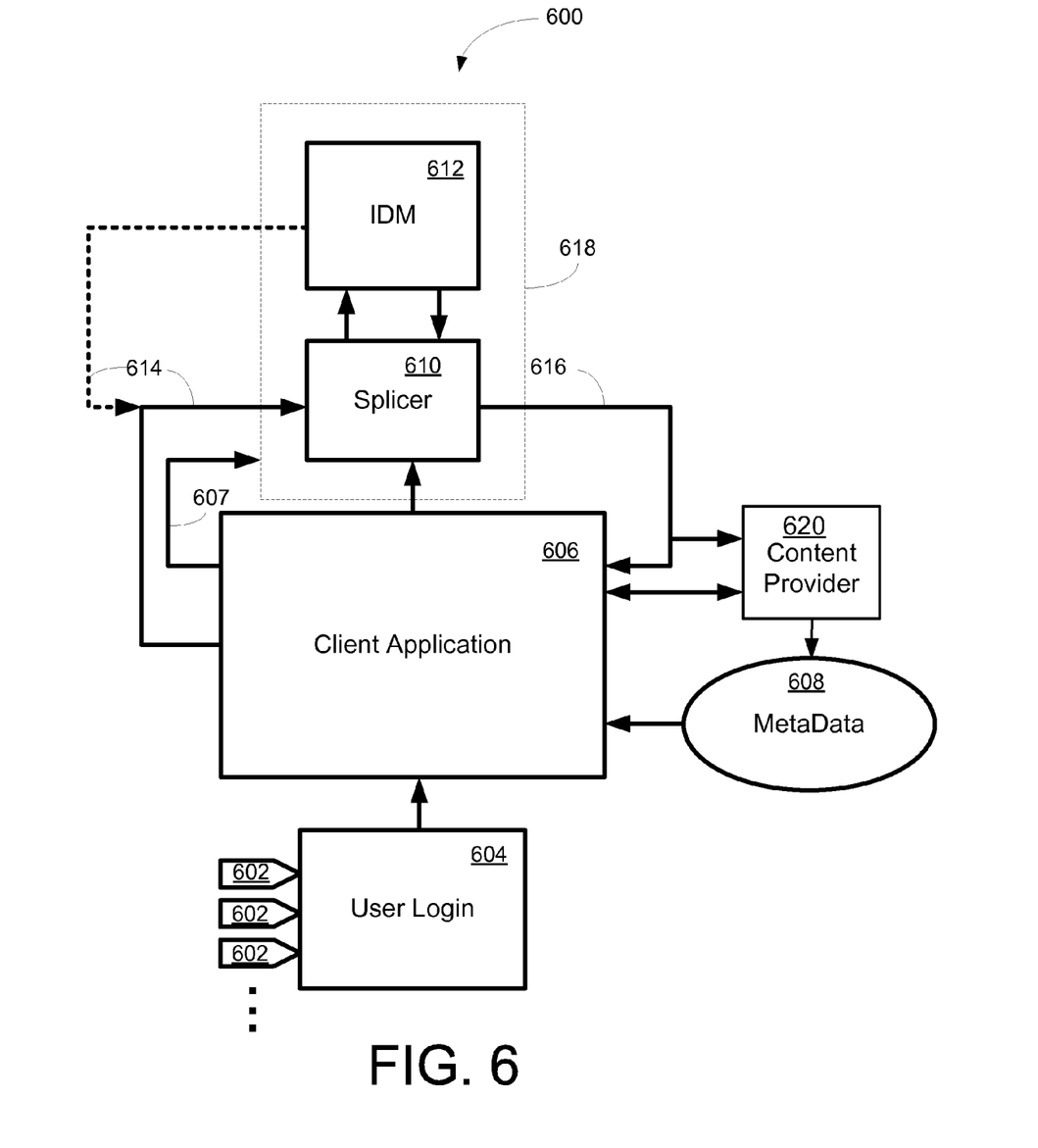
FIG. 6 is an example dataflow diagram, according to an example embodiment of the invention.

FIG. 6 depicts an example dataflow diagram 600 of processes for generating and handling spliced profiles. The example blocks in this dataflow diagram may be carried out in one or more of the hardware and/or software blocks or modules depicted in FIG. 5. According to an example embodiment of the invention, multiple users 602 may log in 604 to a client application 606. In one example embodiment, the client application 606 may be a recommendation and/or access engine. In another example embodiment, the client application 606 may be an e-mail application. The client application 606 may provide profile information 607 to one or more modules 618 for processing. For example, when a new profile is being built for a new user, information pertaining to the person's age, gender, preferences, etc., may be fed to the identification management module 612, which may further process, parse, and/or save the profile information for later use the next time the new user logs in with a user name and password. In one example embodiment, the client application 606 may provide splicing logic 614 to a splicer 610. In another example embodiment, the identification management module 612, or a related module, may optionally provide splicing logic 614 to a splicer 610. According to example embodiments, the splicing logic 614 may be based on rules or logic, either pre-determined as a function of the individual client application 606, or keyed off the user profile information. For example, if all users except for one are adults, the splicing logic 614 may restrict certain programming or content since it may be inappropriate for a child. In an example embodiment, the splicing logic 614 may be determined, either in the client application, or via the identification management module 612. According to an example embodiment of right restrictions, splicing logic may also be influenced by the content provider.

In one example embodiment, the splicing logic 614 may be determined via a lookup table. The splicing logic 614 may be utilized by the splicer 610 to generate a new spliced profile from the multiple profiles provided by the identification management module 612. According to an example embodiment, one or more records may be updated based on the new spliced profile 616. According to an example embodiment, the spliced profile 616 may be generated and used by the client application 606 and/or a content provider 620. According to an example embodiment, the spliced profile 616 may include a transient duration. In an example embodiment, metadata 608 associated with content may be utilized by the client application 606, and selected based on the spliced profile 616, for example, to provide a content recommendation and/or access to the users. In accordance with example embodiments of the invention, the spliced profile 616 may persist in use only for the duration of a given access session. In other embodiments, the spliced profile 616 may persist longer than a given access session, for example for audit purposes.

Figure 7:
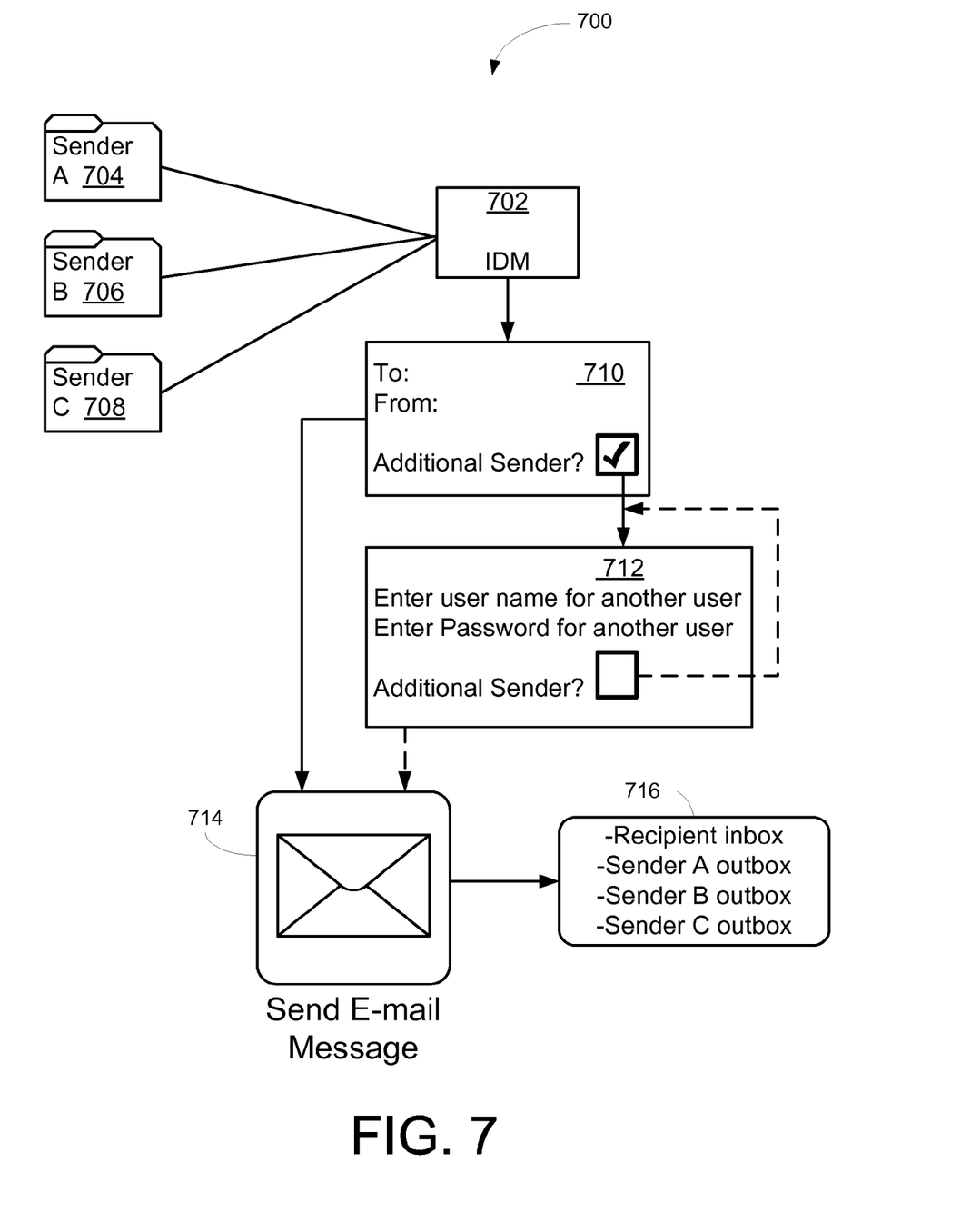
FIG. 7 is a block diagram of an e-mail profile combiner/splicer management process, according to an example embodiment of the invention.

FIG. 7 depicts a block diagram of an example e-mail system 700 that may utilize splice identities. In an example embodiment, various potential senders may have corresponding electronic folders 704, 706, 708, which may include salutations, electronic signatures, distribution lists, return addresses, phone numbers etc. According to an example embodiment, the electronic folders 704, 706, 708 may be utilized by an identity management system 702 for generating e-mail and/or routing policies for the e-mail. In an example embodiment, the e-mail system 700 may be utilized to generate an e-mail message, for example from a first sender 704. In an example embodiment, an option 710 may allow adding additional senders to the message. According to an example embodiment, the new sender's credentials (user name and password, for example) may be entered, with a recursive process 712 that may allow adding additional senders. According to an example embodiment, an e-mail message 714 may be generated and sent 716 to the recipient's inbox, and to the outboxes of the selected senders.

Figure 8:
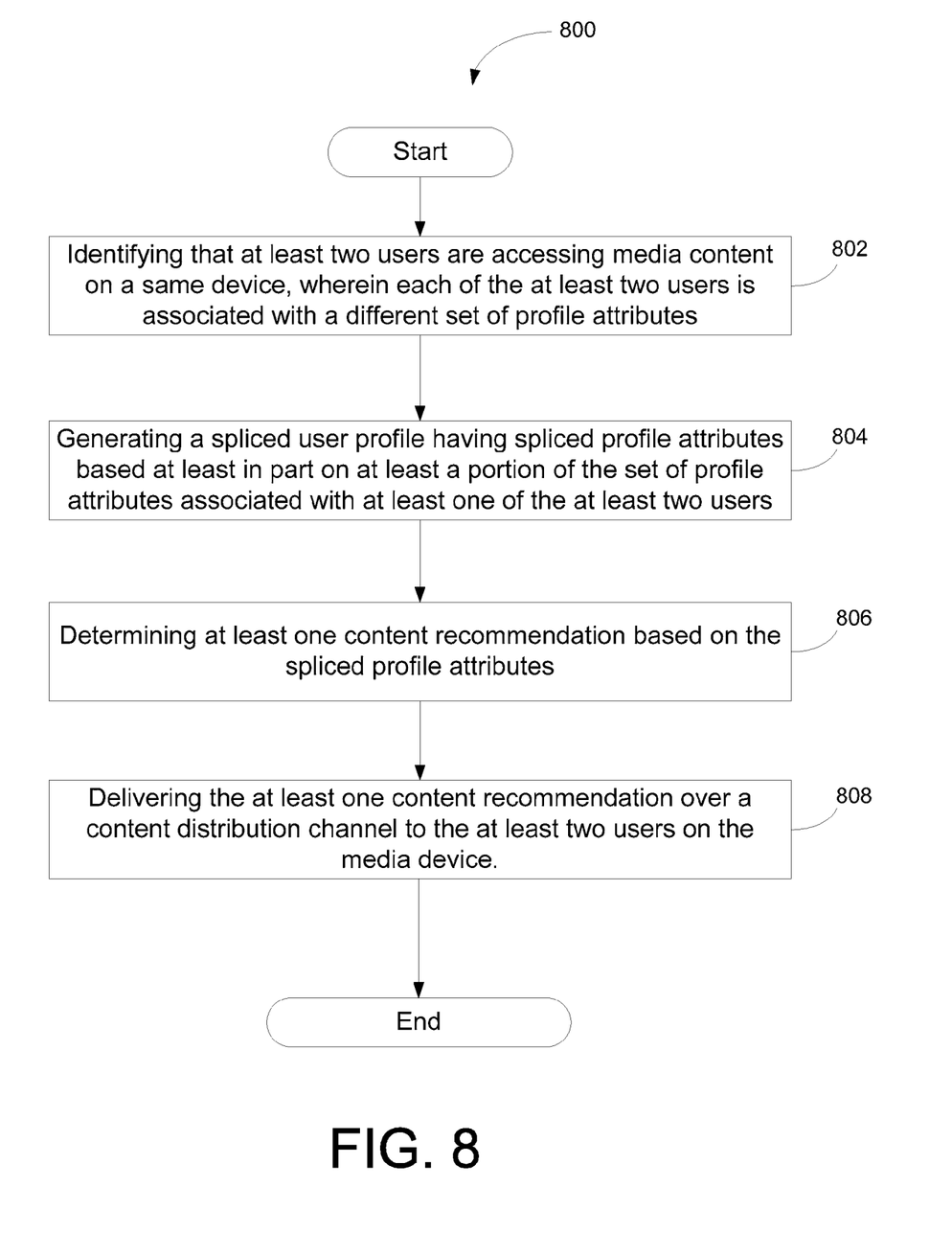
FIG. 8 is a flow diagram of a method, according to an example embodiment of the invention.

An example method 800 for combining user profiles to refine group content choice suggestions and access will now be described with reference to the flow diagram of FIG. 8. The method 800 starts in block 802, and according to an example embodiment of the invention, includes identifying that at least two users are accessing media content on a same device, wherein each of the at least two users is associated with a different set of profile attributes. In block 804, the method 800 includes generating a spliced user profile having spliced profile attributes based at least in part on at least a portion of the set of profile attributes associated with at least one of the at least two users. In block 806, the method 800 includes determining at least one content recommendation based on the spliced profile attributes. In block 808, the method 800 includes delivering the at least one content recommendation over a content distribution channel to the at least two users on the media device(s). The method 800 ends after block 808. According to example embodiments, the invention may include receiving login credentials for the at least two users and accessing the sets of profile attributes of the at least two users based at least in part on the login credentials for the at least two users. In an example embodiment, generating the spliced user profile may include generating an inclusive spliced user profile that associates one or more profile attributes of at least one of the at least two users. In an example embodiment, the inclusive spliced user profile is associated with at least one profile attribute that is not shared by all of the at least two users. In an example embodiment, generating the spliced user profile includes combining one or more of the profile attributes using any combination of logical operators including Boolean operators, weighted combinations, or fuzzy logic operators. According to an example embodiment, the spliced user profile may persist only for a duration associated with a session of access to content or service. In another example embodiment, the spliced user profile persists beyond a duration associated with a session of access to content or service for recording usage by the at least two users.

According to an example embodiment, generating the spliced user profile may include generating an exclusive spliced user profile that associates one or more profile attributes shared by all of the at least two users. In an example embodiment, the exclusive spliced user profile is not associated with any profile attributes that are not shared by all of the at least two users. According to an example embodiment, generating the spliced user profile comprises generating an exclusive spliced user profile that associates two or more profile attributes shared by all of the at least two users. According to an example embodiment, the exclusive spliced user profile is not associated with any profile attributes that are not shared by all of the at least two users. In an example embodiment, the at least one recommendation is for content having a plurality of content attributes associated therewith, wherein a predefined number of the plurality of attributes satisfy a plurality of the spliced profile attributes. According to an example embodiment, a predefined number of the plurality of content attributes may include at least a majority of the plurality of attributes. According to an example embodiment, generating the spliced user profile can include combining inclusive and exclusive spliced attributes shared by at least one of the at least two users. According to an example embodiment, the media content may include one or more of: (a) cable audio/video (A/V) content; (b) satellite A/V content; (c) Internet content; (d) digital audio content; (e) advertising content; (f) software application content; or (g) wireless communications content. According to an example embodiment, the media content may include one or more of: (a) linear A/V programming; (b) non-linear A/V programming; or (c) non-video content.

According to an example embodiment, the at least one content recommendation includes at least one of: (a) a channel recommendation; (b) a program recommendation; (c) a software application recommendation; (d) an audio content recommendation; or (e) goods or services advertisement. According to an example embodiment, the profile attributes include one or more of content preferences or content access rights. In an example embodiment, determining the at least one content recommendation further includes limiting the at least one content recommendation based on content access rights associated with at least one of the at least two users. In an example embodiment, the at least one content recommendation is limited based on access rights shared by all of the at least two users.

According to an example embodiment, a system may be provided for combining user profiles to refine group content choices, suggestions, and access. The system may include at least one memory for storing data and computer-executable instructions; and at least one processor configured to access the at least one memory and further configured to execute the computer-executable instructions for: receiving login credentials for at least two users; accessing the sets of profile attributes of the at least two users based at least in part on the login credentials for the at least two users; identifying that the at least two users are accessing media content on a same device or network, wherein each of the at least two users is associated with a different set of profile attributes; generating a spliced user profile having spliced profile attributes based at least in part on at least a portion of the set of profile attributes associated with at least one of the at least two users; determining at least one content recommendation based on the spliced profile attributes; and delivering the at least one content recommendation over a content distribution channel to the at least two users on the media device.

Example embodiments of the invention may also include a method for controlling group access to content. The method may include identifying that at least two users are requesting access to content, wherein each of the at least two users is associated with a different set of access rights; generating a spliced user profile having spliced access rights based at least in part on at least a portion of the access rights associated with at least one of the at least two users; and determining permitted content to be delivered to the at least two users based on the spliced access rights of the spliced user profile. In an example embodiment, generating the spliced user profile may include generating an inclusive spliced user profile that associates one or more access rights of at least one of the at least two users. In an example embodiment, the inclusive spliced user profile is associated with at least one access right that is not shared by all of the at least two users. In an example embodiment, generating the spliced user profile comprises generating an exclusive spliced user profile that associates one or more access rights shared by all of the at least two users. According to an example embodiment, the exclusive spliced user profile is not associated with any access rights that are not shared by all of the at least two users.

According to an example embodiment of the invention, a system is provided for combining user profiles to refine group content choices. The system includes at least one memory for storing data and computer-executable instructions, and at least one processor configured to access the at least one memory and further configured to execute the computer-executable instructions for receiving login credentials for at least two users. In an example embodiment, the processor may be configured to execute the computer executable instructions for receiving other forms of a declaration of presence, or participation that may or may not require authentication or validation. In an example embodiment, the processor may be configured to execute the computer executable instructions for accessing the sets of profile attributes of the at least two users based at least in part on identities or login credentials for the at least two users; identifying that the at least two users are accessing media content on a same device or same distribution system, wherein each of the at least two users is associated with a different set of profile attributes; generating a spliced user profile having spliced profile attributes based at least in part on at least a portion of the set of profile attributes associated with at least one of the at least two users; determining at least one content recommendation based on the spliced profile attributes; and delivering the at least one content recommendation over a content distribution channel to the at least two users on one or more media device that may or may not be geographically co-located.

In an example embodiment, the system may include at least one memory for storing data and computer-executable instructions; and at least one processor configured to access the at least one memory and further configured to execute the computer-executable instructions for receiving login credentials for at least two users; accessing the sets of profile attributes of the at least two users based at least in part on the login credentials for the at least two users; identifying at least two users accessing media content on a same device, wherein each of the at least two users is associated with a respective set of profile attributes; generating a spliced user profile having spliced profile attributes based at least in part on at least a portion of the respective sets of profile attributes associated with at least one of the at least two users; determining at least one content recommendation or access based on the spliced profile attributes; and requesting the at least one content based at least in part on the recommendation or access.

In an example embodiment, the content includes one or more of: (a) cable audio/video (A/V) content; (b) satellite A/V content; (c) Internet content; (d) digital audio content; (e) advertising content; (f) software application content; (g) wireless communications content, (h) linear A/V programming; or (i) non-linear A/V programming. In an example embodiment, the at least one content recommendation or access includes at least one of: (a) at least one channel recommendation; (b) at least one program recommendation; (c) at least one software application recommendation; (d) at least one audio content recommendation; or (e) at least one goods or services advertisement.

According to an example embodiment of the invention, at least one of the at least two users may be located at a separate location, and may access content from a separate device. In another example embodiment, all of the at least two users are at separate locations and all of the at least two users access content from separate devices. In another example embodiment, at least one of the at least two users accesses content via a separate network or application.

According to an example embodiment, generating the spliced user profile includes combining one or more of the profile attributes using a different logical operator for each profile attribute. According to an example embodiment, receiving login credentials for at least two users includes receiving formal login credentials for at least one of the at least two users and registering presence or participation of the remaining users without requiring formal login credentials.

Accordingly, example embodiments of the invention can provide the technical effects of creating certain systems and methods that provide recommendations for content based on user profiles for multiple users. Example embodiments of the invention can provide the further technical effects of providing systems and methods for providing access to content based on user profiles for multiple users.

In example embodiments of the invention, the profile attribute and splicer management system 500 may include any number of hardware and/or software applications that are executed to facilitate any of the operations.

In example embodiments, one or more input/output (I/O) interfaces may facilitate communication between the profile attribute and splicer management system 500, and one or more input/output devices. For example, a universal serial bus port, a serial port, a disk drive, a CD-ROM drive, a network connection, and/or one or more user interface devices, such as a display, keyboard, keypad, mouse, control panel, touch screen display, remote control, microphone, etc., may facilitate user interaction with the profile attribute and splicer management system 500. The one or more I/O interfaces may be utilized to receive or collect data and/or user instructions from a wide variety of input devices. Received data may be processed by one or more computer processors as desired in various embodiments of the invention and/or stored in one or more memory devices.

One or more network interfaces may facilitate connection of the profile attribute and splicer management system 500 inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth™ (Owned by Telefonaktiebolaget L M Ericsson) enabled network, a Wi-Fi™ (owned by Wi-Fi Alliance) enabled network, a satellite-based network, any wired network, any wireless network, etc., for communication with external devices and/or systems.

As desired, embodiments of the invention may include the profile attribute and splicer management system 500 with more or less of the components illustrated in FIG. 5.

The invention is described above with reference to block and flow diagrams of systems and methods and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method for refining group content choices, comprising:
   receiving login credentials for at least two users of a same device;
   accessing a respective set of profile attributes associated with each of the at least two users based at least in part on the login credentials for the at least two users;
   identifying the at least two users accessing content during a session on the same device;
   identifying at least one profile attribute of the respective set of profile attributes that is shared by all of the at least two users;
   generating a spliced user profile having spliced profile attributes, wherein the generating comprises combining the identified at least one profile attribute shared by all of the at least two users, the combining based at least in part on at least a portion of the respective sets of profile attributes associated with the at least two users;
   determining, by a system comprising at least one processor, at least one content recommendation or access based on the spliced profile attributes; and
   requesting the at least one content based at least in part on the recommendation or access determination.

2. The method of claim 1, wherein generating the spliced user profile further comprises associating one or more additional profile attributes of at least one of the at least two users.

3. The method of claim 2, wherein at least one of the one or more additional profile attributes is not shared by all of the at least two users.

4. The method of claim 1, wherein generating the spliced user profile comprises generating an exclusive spliced user profile that associates the at least one profile attribute shared by all of the at least two users.

5. The method of claim 4, wherein the exclusive spliced user profile is not associated with any profile attributes that are not shared by all of the at least two users.

6. The method of claim 1, wherein generating the spliced user profile comprises generating an exclusive spliced user profile that associates two or more profile attributes shared by all of the at least two users.

7. The method of claim 6, wherein the exclusive spliced user profile is not associated with any profile attributes that are not shared by all of the at least two users.

8. The method of claim 1, wherein the at least one recommendation or access is for content having a plurality of content attributes associated therewith; and
   wherein a predefined number of the plurality of attributes satisfy a plurality of the spliced profile attributes.

9. The method of claim 8, wherein the predefined number of the plurality of content attributes comprises at least a majority of the plurality of attributes.

10. The method of claim 1, wherein generating the spliced user profile further comprises combining inclusive and exclusive spliced attributes shared by at least one of the at least two users.

11. The method of claim 1, wherein the content comprises one of: (a) cable audio/video (A/V) content; (b) satellite A/V content; (c) Internet content; (d) digital audio content; (e) advertising content; (f) software application content; or (g) wireless communications content.

12. The method of claim 1, wherein the content comprises one of: (a) linear A/V programming; or (b) non-linear A/V programming.

13. The method of claim 1, wherein the at least one content recommendation comprises at least one of: (a) at least one channel recommendation; (b) at least one program recommendation; (c) at least one software application recommendation; (d) at least one audio content recommendation; or (e) at least one goods or services advertisement.

14. The method of claim 1, wherein the profile attributes comprise content preferences.

15. The method of claim 1, wherein the profile attributes comprise content access rights.

16. The method of claim 15, wherein determining the at least one content recommendation or access further comprises limiting the at least one content recommendation based on content access rights associated with at least one of the at least two users.

17. The method of claim 16, wherein the at least one content recommendation or access is limited based on access rights shared by all of the at least two users.

18. The method of claim 1, wherein generating the spliced user profile comprises combining one or more of the profile attributes using any combination of logical operators including Boolean operators, weighted combinations, or fuzzy logic operators.

19. The method of claim 1, wherein the spliced user profile persists only for a duration associated with a session of access to content or service.

20. The method of claim 1, wherein the spliced user profile persists beyond a duration associated with a session of access to content or service for recording usage by the at least two users.

21. A system for combining user profiles to refine group content choices, the system comprising:
   at least one memory for storing data and computer-executable instructions; and at least one processor configured to access the at least one memory and further configured to execute the computer-executable instructions for:
   receiving login credentials for at least two users of a same device;
   accessing a respective set of profile attributes associated with each of the at least two users based at least in part on the login credentials for the at least two users;
   identifying the at least two users accessing media content during a session on the same device;
   identifying at least one profile attribute of the respective set of profile attributes that is shared by all of the at least two users;
   generating a spliced user profile having spliced profile attributes, wherein the generating comprises combining the identified at least one profile attribute shared by all of the at least two users, the combining based at least in part on at least a portion of the respective sets of profile attributes associated with the at least two users;
   determining at least one content recommendation or access based on the spliced profile attributes; and
   requesting the at least one content based at least in part on the recommendation or access.

22. The system of claim 21, wherein the content comprises one or more of: (a) cable audio/video (A/V) content; (b) satellite A/V content; (c) Internet content; (d) digital audio content; (e) advertising content; (f) software application content; (g) wireless communications content, (h) linear A/V programming; or (i) non-linear A/V programming.

23. The system of claim 21, wherein the at least one content recommendation or access comprises at least one of: (a) at least one channel recommendation; (b) at least one program recommendation; (c) at least one software application recommendation; (d) at least one audio content recommendation; or (e) at least one goods or services advertisement.

24. The system of claim 21, wherein generating the spliced user profile comprises combining one or more of the profile attributes using a different logical operator for each profile attribute.

25. The system of claim 21, wherein receiving login credentials for at least two users comprises receiving formal login credentials for at least one of the at least two users and registering presence or participation of the remaining users without requiring formal login credentials.

* * * * *